Feb. 3, 1959 M. C. WERST 2,871,974
ELECTROSTATIC PRECIPITATORS
Filed April 16, 1956 2 Sheets-Sheet 1

Inventor:
Mervin C. Werst;
by Robert J. Palmer
Attorney

Feb. 3, 1959 M. C. WERST 2,871,974
ELECTROSTATIC PRECIPITATORS
Filed April 16, 1956 2 Sheets-Sheet 2
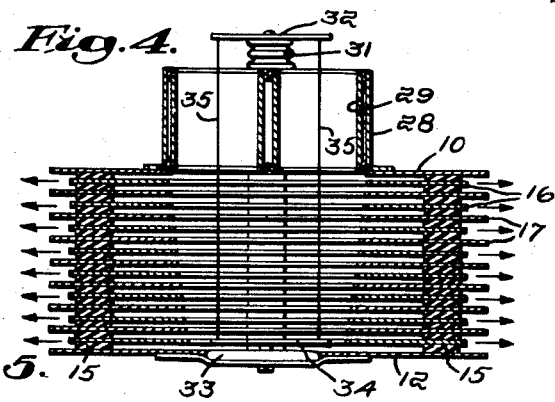
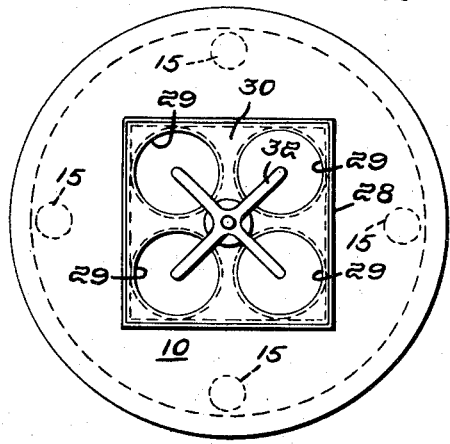
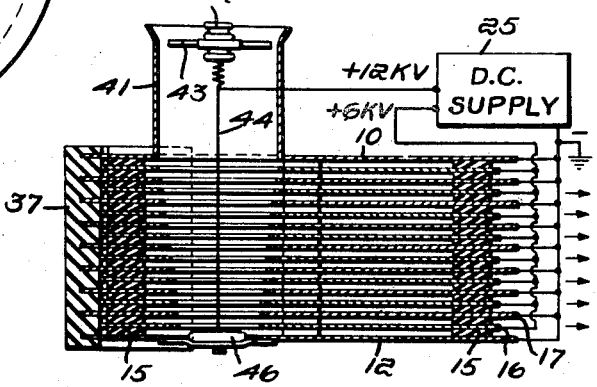
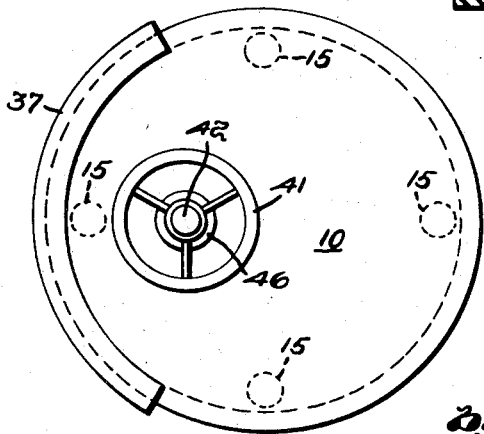
Inventor:
Mervin C. Werst,
by Robert J. Palmer
Attorney United States Patent Office 2,871,974
Patented Feb. 3, 1959

2,871,974
ELECTROSTATIC PRECIPITATORS

Mervin C. Werst, Penn Township, Allegheny County, Pa., assignor to Westinghouse Electric Corporation, East Pittsburgh, Pa., a corporation of Pennsylvania Application April 16, 1956, Serial No. 578,392

8 Claims. (Cl. 183—7)

This invention relates to electrostatic precipitators such as are used for cleaning gases such as air.

In the usual electrostatic precipitator designed for cleaning air, the air to be cleaned flows in a generally straight path, first through an ionizer, and then between parallel collector plates. Such precipitators do not realize their maximum efficiency due to some of the air by-passing collector plate surfaces or passing between collector plate surfaces where the electrostatic fields are weak.

This invention provides an electrostatic precipitator having parallel collector plates which except for an end plate have aligned openings. The air to be cleaned enters the collector cell through the openings and flows between the plates towards their outer edges. One end plate has no openings; this prevents the air from by-passing the collector cell.

A feature of this invention resides in varying the size of the openings in the collector plates for controlling the distribution of air from the collector cell.

Another feature of this invention resides in the provision of one or more ionizer wires which extend through the ionizer into the collector cell through the aligned openings in the collector plates.

An object of this invention is to increase the efficiencies of electrostatic precipitators.

This invention will now be described with reference to the annexed drawings, of which:

Fig. 4 is a side section of still another electrostatic precipitator embodying this invention;

Fig. 5 is a plan view of the precipitator of Fig. 4;

Fig. 6 is a side section of still another electrostatic precipitator embodying this invention, and Fig. 7 is a plan view of the precipitator of Fig. 6.

Figure 1:
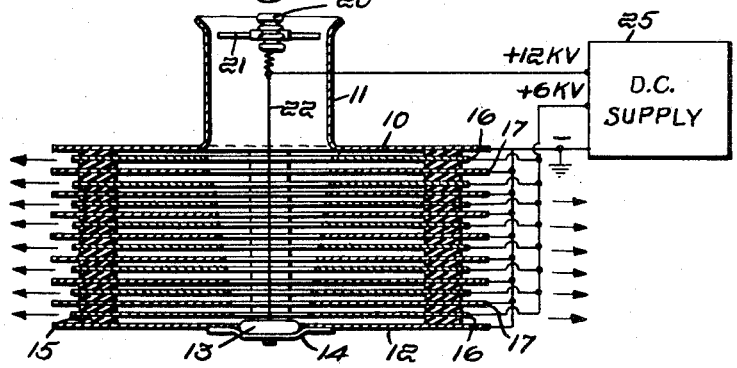
Fig. 1 is a side section of an electrostatic precipitator embodying this invention.
Figure 2:
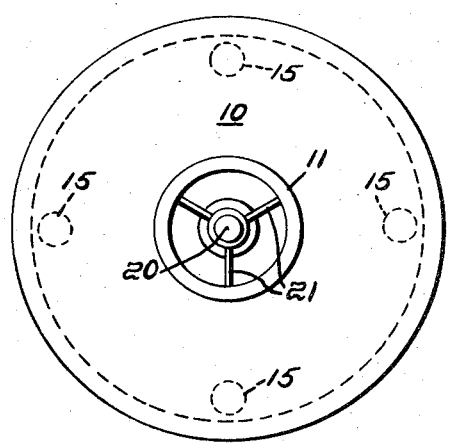
Fig. 2 is a plan view looking downwardly upon the precipitator.

Referring first to Figs. 1 and 2, a circular inlet plate 10 of sheet metal has an outwardly turned cylindrical portion 11 forming a non-discharging ionizer electrode of the Cottrell type. A circular end plate 12 at the opposite side of the precipitator extends parallel to the outer portions of the plate 10, and has an electric insulator 13 fitted closely into a central opening in the plate 12, and held in position by a strap 14.

Supported between the plates 10 and 12 by electric spacer insulators 15 are circular charged plates 16 and circular grounded plates 17, the plates 16 and 17 being alternately arranged. These plates have circular central openings therein, the centers of which are aligned with the axis of the cylindrical non-discharging electrode 11, these openings becoming progressively smaller in diameter toward the end plate 12.

An electric insulator 20 is supported by rods 21 in the upper center of the cylindrical electrode 11, and an ionizer wire 22 is supported from and between the insulators 20 and 13 and extends along the axis of the cylindrical electrode 11 and through the centers of the circular openings in the plates 10, 16 and 17.

The spacer insulators 15 are of the type described in the G. W. Penney Patent No. 2,347,709.

The ionizer wire 22 is connected to a positive terminal, which may be a 12-kv. terminal, of a conventional power pack 25. The charged plates 16 are connected to another positive terminal, which may be a 6 kv. terminal, of the power pack. The ground plates 17 and the end plates 10 and 11 are connected to the negative terminal of the power pack.

In the operation of the precipitator of Figs. 1 and 2, the upper or inlet end of the cylindrical ionizer electrode 11 would be connected to a fan which is not shown, and which would blow air to be cleaned into the cylindrical electrode 11, where the air would be ionized by the electrostatic field between the wire 22 and the electrode 11. The dust and other foreign particles entrained in the air would be given positive electrostatic charges. The air in the collector cell would be deflected by the end plate 12 and would flow outwardly between the collector plates leaving at their outer edges as shown by the arrows of Fig. 1.

If all of the central openings in the collector plates were of the same size, larger volumes of air would flow outwardly between the plates closer to the end plate 12. By tapering the central openings in the collector plates as shown by Fig. 1, so that the plates most remote from the end plate 12 have the larger openings, the resistance to air flow is so controlled that equal volumes of air are discharged between every pair of plates. The electrostatically charged dust particles deposit upon the oppositely charged collector plates in the usual manner.

By extending the ionizer wire 22 through the collector cell, additional ionization takes place in the collector cell, resulting in increased collection efficiency.

Since the insulator 13 fills the central opening in the end plate 12, the effect is the same as if there were no opening, so that all of the air passing through the collector cell is exposed to effective collecting fields.

Figure 3:
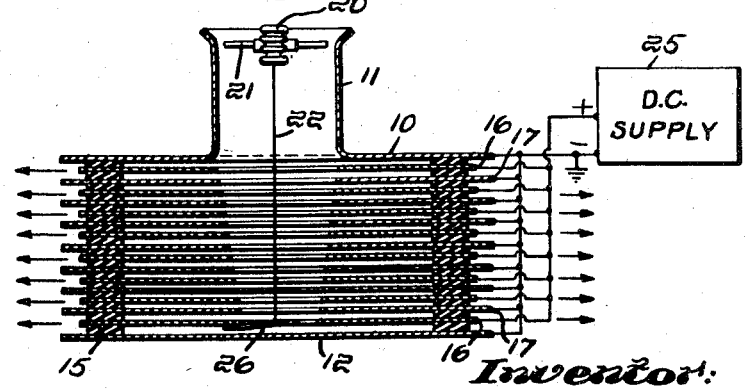
Fig. 3 is a side section of another electrostatic precipitator embodying this invention.

The embodiment of the invention illustrated by Fig. 3 is similar to that of Fig. 1 except that the precipitator is a single-voltage one, the same voltage being applied to the charged collector plates 16 as to the ionizer wire 22. With this arrangement the insulator 13 of Fig. 1 is not needed for supporting the lower end of the ionizer wire, which instead is supported by a spring arm 26 attached to the lowermost charged plate 16.

The embodiment of the invention illustrated by Figs. 4 and 5 is similar to that of Figs. 1 and 2 except instead of using a single ionizer wire and a single cylindrical ionizer electrode around the wire, four ionizer wires and four cylindrical ionizer electrodes are used, the central openings in the plates being made larger to provide adequate clearance for the four wires.

A square metal casing 28 is mounted on the inlet plate 10 and its center in alignment with the aligned centers of the circular openings in the collector plates. Four cylindrical ionizer electrodes 29 of metal are placed with the casing 28 with a plate 30 therearound which extends to the sides of the casing 28 and prevents passage of air into the collector cell except through the cylindrical ionizer electrodes 29.

An electric insulator 31 is supported at the upper end of the casing 28, and supports four ionizer wire supporting arms 32. An insulator 33 closely fitted in a central opening in the end plate supports four ionizer wire supporting arms 34. Four ionizer wires 35 are supported between corresponding arms 32 and 34 along the axes of corresponding cylindrical electrodes 29.

The operation of the precipitator of Figs. 4 and 5 is similar to that of Fig. 1, and has the advantage that due to the use of additional ionizer wires, larger volumes or velocities of air can be used without loss in efficiency.

In the previously described embodiments of the invention, the clean air leaving the collector cell was emitted from all around the cell with the openings in the collector plates centrally located. In the embodiment of the invention illustrated in Figs. 6 and 7, one side of the cell is baffled with the aligned openings in the collector plates located adjacent that side instead of being located centrally.

A baffle 37 of electric insulation formed in a circular arc extends partially around the collector cell as shown by Fig. 7, and prevents air from passing out the baffled off portion of the cell. A cylindrical ionizer electrode 41 which is similar to that of Figs. 1 and 2 is located adjacent the baffle 37, and the center openings in the plates 10, 16 and 17 are aligned with the cylindrical electrode 41. An insulator 42 supported by arms 43 in the upper portion of the electrode 41 supports the upper end of an ionizer wire 44, the lower end of which is supported by an insulator 46 closely fitted in the end wall 12.

While embodiments of this invention have been described for the purpose of illustration, it should be understood that the invention is not limited to the exact apparatus and arrangements of apparatus illustrated, since modifications thereof may be suggested by those skilled in the art, without departure from the essence of the invention.

What I claim as my invention is:

1. An electrostatic precipitator comprising a plurality of spread-apart, parallel collector plates, an inlet plate extending parallel to said plates on one side thereof, an end plate extending parallel to said collector plates on the other side thereof, said plates except for said end plate having aligned openings therein, a non-discharging ionizer electrode having a cylindrical inner surface on the outer side of said inlet plate around the opening therein, an ionizer wire within said electrode and in the openings in said collector plates, means for supporting one end of said wire adjacent the outer end of said electrode, and means supporting the other end of said wire adjacent said end plate.

2. An electrostatic precipitator as claimed in claim 1 in which the wire supporting means includes electric insulators at the ends of the wire.

3. The invention claimed in claim 1 in which the wire supporting means adjacent said outer end of said electrode includes an electric insulator, and in which the wire supporting means adjacent said end plate includes spring means attached to one of said collector plates.

4. An electrostatic precipitator as claimed in claim 1 in which the plates are annular, in which a baffle extends partially around said plates in contact with the outer edge thereof, and in which the openings in the plates are located between the centers of the plates and the baffle.

5. An electrostatic precipitator comprising a plurality of spaced-apart, parallel collector plates, an inlet plate extending parallel to said plates on one side thereof, an end plate extending parallel to said collector plates on the other side thereof, said plates except for said end plate having aligned openings therein, and a baffle extending partially around said plates in contact with the outer edges thereof, said openings in said inlet and collector plates being located between the centers of said plates and said baffle.

6. An electrostatic precipitator as claimed in claim 5 in which a non-discharging ionizer electrode having a cylindrical inner surface is provided on the side of said inlet plate opposite said collector plates and aligned with said openings, in which an ionizer wire is provided and located centrally within said electrode and said openings in said plates, in which means is provided for supporting one end of said wire adjacent the outer end of said electrode, and in which means is provided for supporting the other end of said wire adjacent said end plate.

7. An electrostatic precipitator as claimed in claim 5 in which the collector plates are circular, and in the portions of the baffle contacting the plates are formed in circular arcs.

8. An electrostatic precipitator as claimed in claim 5 in which the openings in said collector plates taper progressively in size from largest in the collector plate nearest said inlet plate to smallest in the collector plate nearest said end plate.

References Cited in the file of this patent

UNITED STATES PATENTS

| 2,721,622 | Ditzler | Oct. 25, 1955 |
| 2,776,724 | Goldschmied | Jan. 8, 1957 |

FOREIGN PATENTS

| 331,381 | Germany | Jan. 6, 1921 |